United States Patent
Surendra et al.

(10) Patent No.: US 10,872,309 B2
(45) Date of Patent: Dec. 22, 2020

(54) SYSTEM AND METHOD FOR ROOT CAUSE ANALYSIS AND EARLY WARNING OF INVENTORY PROBLEMS

(71) Applicant: JDA Software Group, Inc., Scottsdale, AZ (US)

(72) Inventors: Shipra Surendra, Bangalore (IN); Manish Ghosh, Bangalore (IN); Adeel Najmi, Plano, TX (US); Arindam Banerjee, New Delhi (IN); Krishna Pal Singh, Bangalore (IN)

(73) Assignee: Blue Yonder Group, Inc., Scottsdale, AZ (US)

(*) Notice: Subject to any disclaimer, the term of this patent is extended or adjusted under 35 U.S.C. 154(b) by 92 days.

(21) Appl. No.: 15/797,381

(22) Filed: Oct. 30, 2017

(65) Prior Publication Data
US 2018/0068259 A1 Mar. 8, 2018

Related U.S. Application Data (63) Continuation of application No. 12/619,805, filed on Nov. 17, 2009, now Pat. No. 9,805,330.
(Continued)

(51) Int. Cl.
*G06Q 20/00* (2012.01)
*G06Q 10/08* (2012.01)
(Continued)

(52) U.S. Cl.
CPC ......... *G06Q 10/087* (2013.01); *G06Q 10/06* (2013.01); *G06Q 10/067* (2013.01); *G06Q 20/203* (2013.01)

(58) Field of Classification Search
CPC ..................................................... G06Q 10/087
(Continued)

(56) References Cited

U.S. PATENT DOCUMENTS 5,953,707 A * 9/1999 Huang ............... G06Q 10/06
705/7.25
6,954,736 B2 10/2005 Menninger et al.
(Continued)

FOREIGN PATENT DOCUMENTS

TW I301593 10/2008
TW 200844879 11/2008

OTHER PUBLICATIONS

Search Report for Taiwan Invention Patent Application No. 098139378; dated Sep. 9, 2014; p. 1.

*Primary Examiner* — Rokib Masud
(74) *Attorney, Agent, or Firm* — Spencer Fane LLP; Steven J. Laureanti (57) ABSTRACT

A system and method is disclosed for root cause analysis and early warning of inventory problems. The system includes a server coupled with a database and configured to access the data describing inventory policy parameters of a supply chain network, the data describing one or more demand patterns and one or more replenishment patterns of the supply chain network, and the data describing the supply chain network comprising a plurality of entities, each entity configured to supply one or more items to satisfy a demand. The server is further configured to optimize the inventory policy parameters for each of the one or more items according to the one or more demand patterns and the one or more replenishment patterns and store the optimized inventory policy parameters in the database for each of the one or more items.

18 Claims, 3 Drawing Sheets

Related U.S. Application Data

(60) Provisional application No. 61/116,287, filed on Nov. 19, 2008.

(51) Int. Cl.
  *G06Q 10/06* (2012.01)
  *G06Q 20/20* (2012.01)

(58) Field of Classification Search
  USPC .................................................. 705/16, 21
  See application file for complete search history.

(56) References Cited

U.S. PATENT DOCUMENTS

| | | |
|---|---|---|
| 7,424,440 B1 | 9/2008 | Gupta et al. |
| 8,655,749 B2 | 2/2014 | Schweitzer et al. |
| 2002/0072988 A1* | 6/2002 | Aram .................. G06Q 10/087 |
| | | 705/26.1 |
| 2002/0143669 A1* | 10/2002 | Scheer ................ G06Q 10/087 |
| | | 705/28 |
| 2006/0069598 A1* | 3/2006 | Schweitzer ............ G06Q 10/08 |
| | | 705/7.25 |

* cited by examiner

SYSTEM AND METHOD FOR ROOT CAUSE ANALYSIS AND EARLY WARNING OF INVENTORY PROBLEMS

CROSS-REFERENCE TO RELATED APPLICATIONS

This application is a continuation of U.S. patent application Ser. No. 12/619,805, filed on Nov. 17, 2009, entitled "System and Method for Root Cause Analysis and Early Warning of Inventory Problems," which claims the benefit under 35 U.S.C. § 119(e) to U.S. Provisional Application No. 61/116,287, filed November 19, 2008, and entitled "A Framework for Inventory Performance Root Cause Analysis." U.S. patent application Ser. No. 12/619,805 and U.S. Provisional Application No. 61/116,287 are assigned to the assignee of the present application. The subject matter disclosed in U.S. patent application Ser. No. 12/619,805 and U.S. Provisional Application No. 61/116,287 is hereby incorporated by reference into the present disclosure as if fully set forth herein.

TECHNICAL FIELD OF THE INVENTION

This invention relates generally to inventory planning, and more particularly to system and method for root cause analysis and early warning of inventory problems.

BACKGROUND OF THE INVENTION

Due to global supply and distribution networks, finished goods (FG) and components travel around the globe as they are procured manufactured and distributed to reach the end customer or consumer. Managing finished goods and component inventory in conditions where demand pattern varies across markets, product lifecycles evolve and sale prices erode over time is a challenging and daunting task. If, for example, components are procured too early and not consumed, the buying entity ends up losing money on price leverage on the one hand and taking aging inventory losses on the other. Conversely if inventory shortages occur due to insufficient supply, then revenue opportunities are missed. The inability to effectively manage finished goods and component inventory is undesirable.

SUMMARY OF THE INVENTION

A system for for root cause analysis and early warning of inventory problems is disclosed. The system includes a database that stores data describing inventory policy parameters of a supply chain network, data describing one or more demand patterns and one or more replenishment patterns of the supply chain network, and data describing the supply chain network comprising a plurality of entities, each entity configured to supply one or more items to satisfy a demand. The system further includes a server coupled with a database and configured to access the data describing inventory policy parameters of a supply chain network, the data describing one or more demand patterns and one or more replenishment patterns of the supply chain network, and the data describing the supply chain network comprising a plurality of entities, each entity configured to supply one or more items to satisfy a demand. The server is further configured to optimize the inventory policy parameters for each of the one or more items according to the one or more demand patterns and the one or more replenishment patterns and store the optimized inventory policy parameters in the database for each of the one or more items.

A method of for root cause analysis and early warning of inventory problems is also disclosed. The method provides for accessing, by a computer, data describing the inventory policy parameters, data describing the one or more demand patterns and the data describing the one or more replenishment patterns, and data describing the supply chain network. The method further provides for optimizing, by the computer, the inventory policy parameters for each of the one or more items according to the one or more demand patterns and the one or more replenishment patterns and storing, by the computer, the optimized inventory policy parameters in the database for each of the one or more items.

A computer-readable medium embodied with software enabling root cause analysis and early warning of inventory problems in a supply chain network is also disclosed. The software when executed using one or more computers is configured to access data describing the inventory policy parameters, data describing the one or more demand patterns and the data describing the one or more replenishment pattern, and data describing the supply chain network. The software is further configured to optimize the inventory policy parameters for each of the one or more items according to the one or more demand patterns and the one or more replenishment patterns and store the optimized inventory policy parameters in the database for each of the one or more items.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
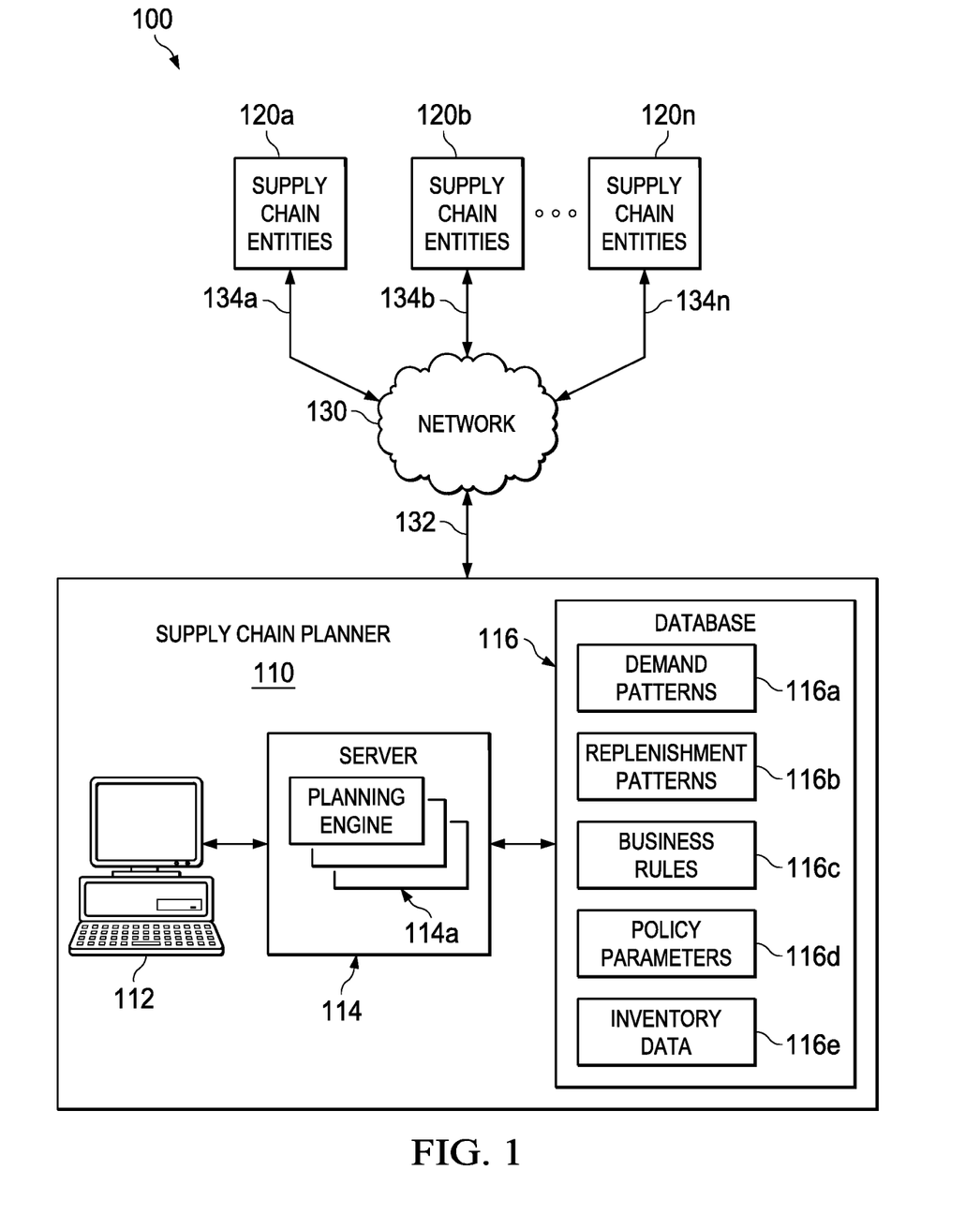
FIG. 1 illustrates an exemplary system according to a preferred embodiment.

FIG. 1 illustrates exemplary system 100 according to a preferred embodiment. System 100 comprises supply chain planner 110, one or more supply chain entities 120a-120n, a network 130, and communication links 132 and 134a-134n. Although a single supply chain planner 110, one or more supply chain entities 120a-120n, and a single network 130, are shown and described; embodiments contemplate any number of supply chain planners 110, any number of supply chain entities 120a-120n, and/or any number of networks 130, according to particular needs. In addition, or as an alternative, supply chain planner 110 may be integral to or separate from the hardware and/or software of any one of the one or more supply chain entities 120a-120n.

In one embodiment, one or more supply chain entities 120a-120n represent one or more supply chain networks including one or more entities, such as, for example suppliers, manufacturers, distribution centers, retailers, and/or customers. A supplier may be any suitable entity that offers to sell or otherwise provides one or more items (i.e., materials, components, or products) to one or more manufacturers. A manufacturer may be any suitable entity that manufactures at least one finished good. A manufacturer may use one or more items during the manufacturing process to produce a finished good. In this document, the phrase "finished good" may refer to any manufactured, fabricated, assembled, or otherwise processed item, material, component, good or product. A finished good may represent an item ready to be supplied to, for example, another supply chain entity in system 100, such as a supplier, an item that needs further processing, or any other item. A manufacturer may, for example, produce and sell a finished good to a supplier, another manufacturer, a distribution center, a retailer, a customer, or any other suitable person or entity. A distribution center may be any suitable entity that offers to sell or otherwise distributes at least one finished good to one or more retailers and/or customers. A retailer may be any suitable entity that obtains one or more finished goods to sell to one or more customers.

Although one or more supply chain entities 120a-120n are shown and described as separate and distinct entities, the same person or entity can simultaneously act as any one of the one or more supply chain entities 120a-120n. For example, one or more supply chain entities 120a-120n acting as a manufacturer could produce a finished good, and the same entity could act as a supplier to supply an item to another supply chain. Although one example of a supply chain network is shown and described, embodiments contemplate any operational environment and/or supply chain network, without departing from the scope of the present invention.

Supply chain planner 110 comprises one or more computers 112, server 114, and databases 116. Server 114 comprises one or more planning engines 114a. Although server 114 is shown and described as comprising one or more planning engines 114a, embodiments contemplate any suitable engines, solvers, or combination of engines and/or solvers, according to particular needs.

Database 116 comprises one or more databases or other data storage arrangements at one or more locations, local to, or remote from, server 114. Databases 116 may be coupled with server 114 using one or more local area networks (LANs), metropolitan area networks (MANs), wide area networks (WANs), network 130, such as, for example, the Internet, or any other appropriate wire line, wireless, or other links. Databases 116 stores data that describes one or more supply chain networks of one or more supply chain entities 120a-120n and describes one or more supply chain entities 120a-120n. Databases 116 may include data representing, for example, demand patterns 116a, replenishment patterns 116b, business rules 116c, inventory policy parameters 116d, and inventory data 116e.

Business rules 116c encodes specific business rules associated with one or more supply chain entities 120a-120n to identify known patterns of behavior. For example, business rules 116c provides for each rule to detect a particular failure mode which may operate on its own, independent of what other failure modes may already exist. In addition, or as an alternative, each rule may trigger independently of other rules and the same supply chain event within a supply chain network of one or more supply chain entities 120a-120n may trigger multiple rules. Supply chain planner 110 resolves when multiple rules are triggered at the same time for the same event. In one embodiment, a strict precedence is used between rules to allow only one rule to dominate. In another embodiment, overlaps between rules may be resolved with yet additional inference rules stored in business rules 116c, that is, when supply chain planner 110 identifies more than one root cause for the same event.

In one embodiment, one or more planning engines 114a comprise an inference engine which operates systematically over inventory data 116e, such as, for example, performance history data, forecast history data, supplier collaboration history data, replenishment history data and inventory targets history data. The inference engine triggers business rules 116c to resolve overlaps or conflicts between business rules 116c. In addition, or as an alternative, the inference engine determines if the final root cause is independent of the individual rules that identify individual suspicions. In one embodiment, the inference engine provides for an implementation with a database query of database 116. In another embodiment, the inference engine is implemented separate from business rules 116c, that is the inference engine is implemented on rules without knowing what the rule is.

In one embodiment, supply chain planner 110 and/or one or more supply chain entities 120a-120n may each operate on one or more computer systems that are integral to or separate from the hardware and/or software that support system 100. These one or more computer systems may include any suitable input device, such as a keypad, mouse, touch screen, microphone, or other device to input information. An output device may convey information associated with the operation of supply chain planner 110 and one or more supply chain entities 120a-120n, including digital or analog data, visual information, or audio information. These one or more computer systems may include fixed or removable computer-implemented storage media, such as magnetic computer disks, CD-ROM, or other suitable media to receive output from and provide input to system 100. These one or more computer systems may include one or more processors and associated memory to execute instructions and manipulate information according to the operation of system 100.

Supply chain planner 110 and one or more supply chain entities 120a-120n may each operate on separate computer systems or may operate on one or more shared computer systems. Each of these one or more computer systems may be a work station, personal computer (PC), network computer, notebook computer, personal digital assistant (PDA), cell phone, telephone, wireless data port, or any other suitable computing device.

In an embodiment, one or more users may be associated with supply chain planner 110 and/or one or more supply chain entities 120a-120n. These one or more users may include, for example, an "analyst" handling management and planning of the supply chain and/or one or more related tasks within system 100. In addition, or as an alternative, these one or more analysts within system 100 may include, for example, one or more computer systems programmed to autonomously handle planning and/or one or more related tasks within system 100. As discussed above, server 114 may support one or more planning engines 114a, including one or more supply chain replenishment planning engines, to generate supply chain plans based on inputs accessed or received from one or more analysts, one or more demand patterns 116a, replenishment patterns 116b, business rules 116c, inventory policy parameters 116d, and inventory data 116e, as described more fully below.

In one embodiment, supply chain planner 110 is coupled with network 130 using communications link 132, which may be any wireline, wireless, or other link suitable to support data communications between supply chain planner 110 and network 130 during operation of system 100. One or more supply chain entities 120a-120n are coupled with network 130 using communications links 134a-134n, which may be any wireline, wireless, or other link suitable to support data communications between one or more supply chain entities 120a-120n and network 130 during operation of system 100. Although communication links 132 and 134a-134n are shown as generally coupling supply chain planner 110 and one or more supply chain entities 120a-120n to network 130, supply chain planner 110 and one or more supply chain entities 120a-120n may communicate directly with each other, according to particular needs.

In addition, or as an alternative, network 130 may include the Internet and any appropriate local area networks (LANs), metropolitan area networks (MANS), or wide area networks (WANs) coupling supply chain planner 110 and one or more supply chain entities 120a-120n. For example, data may be maintained by supply chain planner 110 at one or more locations external to supply chain planner 110 and one or more supply chain entities 120a-120n and made available to one or more associated users of one or more supply chain entities 120a-120n using network 130 or in any other appropriate manner. Those skilled in the art will recognize that the complete structure and operation of communication network 130 and other components within system 100 are not depicted or described. Embodiments may be employed in conjunction with known communications networks and other components.

In one embodiment and as discussed in more detail below, system 100 provides an automated analysis of large amounts of execution performance data to identify patterns that point to specific root causes. That is, system 100 comprises key inputs that include demand forecast waterfall history and future forecast, shipment/sales history, inventory history, receipts history and forecast (Advance Ship Notices/Commits), inventory targets history and forecast, plus a library of parameterized business rules. In addition, system 100 comprises key outputs that include automated alerts, for example, where demand forecast is out-of-synch with actual, where replenishments are out of synch with forecasts and actual, and where surprise large orders may have occurred. Accordingly, system 100 rapidly diagnosis, for example, if an inventory problem was a result of demand process issues and/or supply process issues. In addition, as explained in more detail in FIGS. 2-4, system 100 provides for a Plan-Do-Check-Act process that facilitates an auto-learning and self-tuning system.

Figure 2:
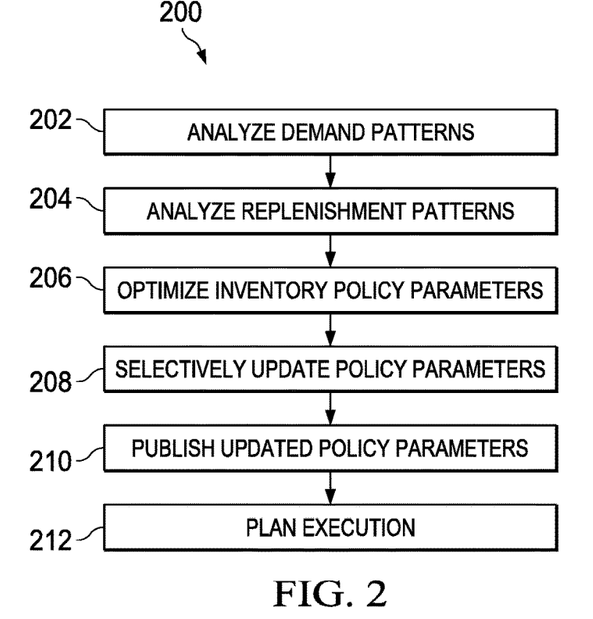
FIG. 2 illustrates an exemplary method of a planning process for determining root causes of inventory performance issues.

FIG. 2 illustrates an exemplary method 200 of a planning process for determining root causes of inventory performance issues. Supply chain planner 110 begins the method at step 202 by analyzing demand patterns 116a of database 116. Demand patterns 116a include, for example, data representing previous forecast demand (historical forecast demand) and actual demand associated with one or more supply chain networks of supply chain entities 120a-120n. Supply chain planner 110 analyzes demand patterns 116a using statistical techniques to compare the forecasted demand with the actual demand and quantify the deviation using, for example, Weighted Mean Absolute Percent Error. Although a particular statistical technique is described, any suitable statistical technique or combination of statistical techniques may be applied to compare the forecasted demand with the actual demand.

In one embodiment, supply chain planner 110 analyzes demand patterns 116a and quantifies the deviation (i.e., quantification of risk), to account for lumpiness, data hygiene factor, and the aggregation level across product geography and time (i.e., appropriate selection of level of abstraction across product, geography and time). Lumpiness represents how clumped or large the demand is relative to its frequency, that is, for example, the distribution of demand over time and how often and how big the demand is. For example, if one or more supply chain entities 120a-120n sells items one per day at a steady rate, the demand is about 30 items per month and there is no lumpiness. However, if one or more supply chain entities 120a-120n sells the same 30 items a month but sells all 30 items in one lump in, for example, the middle of the month, the monthly forecast of 30 items per month is the same, however, the demand pattern in the latter is lumpy, where the demand pattern in the former is not lumpy. Data Hygiene factor is selectively qualifying and/or repairing data based on one or more business rules 116c stored in database 116.

In addition, or as an alternative, if any of demand patterns 116a data is unclean, supply chain planner 110 filters or corrects the data. For example, the cleanliness of demand patterns 116a data may be such that unclean data is presented to system 100, because, for example, the data of one or more supply chain entities 120a-120n may not have been well maintained. Supply chain planner 110 analyzes demand patterns 116a data for patterns of bad data and detects and repairs (i.e., either filters or corrects) the bad data as necessary.

At step 204, supply chain planner 110 analyzes supply replenishment patterns 116b stored in database 116 (i.e., supply side of replenishment patterns) of one or more supply chain networks of supply chain entities 120a-120n and quantifies the supply risk utilizing, for example, lumpiness and the hygiene factor. Replenishment patterns 116b include, for example, data representing the size and frequency of replenishments of one or more supply chain networks of supply chain entities 120a-120n.

At step 206, supply chain planner 110 optimizes inventory policy parameters 116d with up-to-date quantified demand and/or supply risk, including any business objectives stored in business rules of database 116. In addition, supply chain planner 110 analyzes and determines assumptions that go into the optimization and detects root causes in order to fine tune the performance of inventory policy parameters 116d.

At step 208, supply chain planner 110 periodically compares inventory policy parameters 116d with selective updates. That is, supply chain planner 110 selectively updates inventory policy parameters 116d on an as-needed basis, such that, all inventory policy parameters are reviewed but not necessarily updated on fixed intervals, such as for example, every week. In addition, the periodic comparison may be provided on any scheduled time, such as, for example, daily, weekly, monthly, or any other periodic time. However, the periodic comparison is selectively provided to decide which inventory policy parameters 116d to update based on, for example, the above steps 202-206.

At step 210, supply chain planner 110 publishes updated inventory policy parameters 116d from step 208 to one or more planning engines 114a, for example, supply chain replenishment planning engines, of one or more supply chain entities 120a-120n. For example, the published inventory policy parameters 116d are input into the one or more supply chain replenishment planning engines to generate an executable supply chain plan. That is, executable supply chain plans are generated and include, for example, what to make, when to make it, what to move, when to move it, and the like. As discussed above, supply chain planner 110 may be integral to or separate from the hardware and/or software of any one of the one or more supply chain entities 120a-120n and associated with one or more supply chain networks. In addition, supply chain planner 110 may be operated on a global level, that is, supply chain planner 110 may span the whole make-move-store plan (i.e., master planning).

At step 212, supply chain planner 110 executes inventory replenishments and movements as planned in step 210. In addition, or as an alternative, supply chain planner 110 provides for inventory replenishments and movements that may be planned in order to meet demand and to maintain inventory levels within one or more inventory policy parameters 116d.

Figure 3:
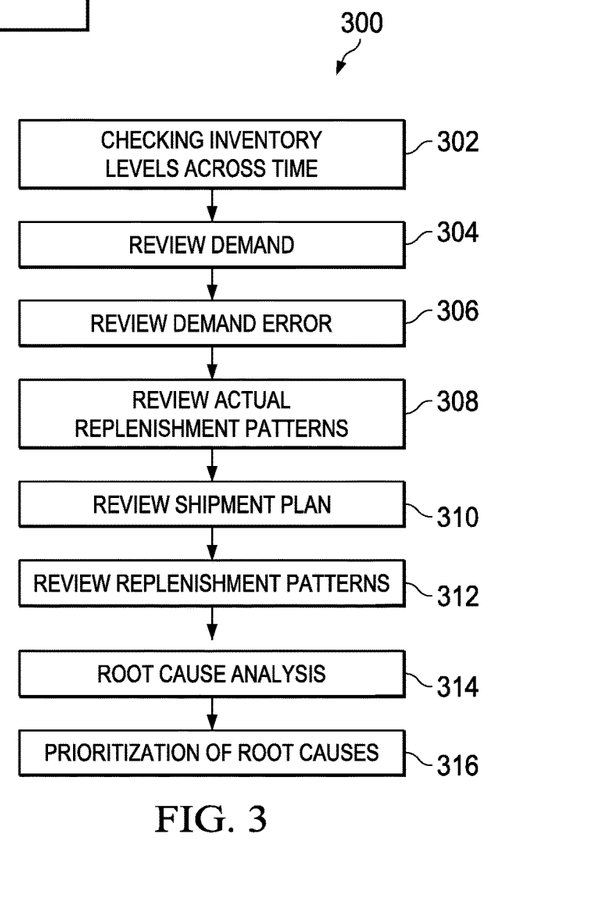
FIG. 3 illustrates an exemplary method of an execution process for determining root causes of inventory performance issues.

FIG. 3 illustrates an exemplary method 300 of an execution process for determining root causes of inventory performance issues. Supply chain planner 110 begins the method at step 302 by checking inventory levels of inventory data 116e across time and determining how the inventory levels performed against published target levels. In one embodiment, this includes both a backward retrospective looking at past inventory performance as well as a forward looking early warning analysis for impending performance issues. In addition, or as an alternative, ending inventory levels for each item at each location (i.e., entity or location within an entity) in each period is coded according to a comparison to published targets. Supply chain planner 110 assigns a coding value to each item. In another embodiment, supply chain planner 110 provides for the coding value to be managed via user configurable thresholds against targets in terms of quantity and/or days of coverage. Exemplary coding values may be as follows:

TABLE 1

| Code Value | Inventory Level |
| --- | --- |
| Code 1 - Red | Inventory stocked out or dangerously below target |
| Code 2 - Yellow | Inventory too low and at high risk of stock-out |
| Code 3 - Green | Inventory is just right and within acceptable tolerances |
| Code 4 - Blue | Inventory is too high |
| Code 5 - Purple | Inventory is excessively too high and may be at risk of obsolescence |

Although an example coding is illustrated and described herein, embodiments contemplate any suitable coding and/or any other suitable technique for providing a framework to articulate rules over the ending inventory levels.

At step 304, supply chain planner 110 analyzes actual demand against predicted demand as well as the evolution of the prediction over time (i.e., a forecast waterfall). That is, supply chain planner 110 determines what was the actual demand against what was the prediction and how did that prediction evolve over time. As an example only, and not by way of limitation, supply chain planner 110 determines a timeframe of when a first indication occurred as to when things were going to be different than predicted and uses that to anticipate such events in the future.

In one embodiment, supply chain planner 110 access historical forecasts, stored in, for example, inventory data 116e of database 116. For example, supply chain planner 110 analyzes the historical forecasts and how they evolved from, for example, eight weeks out to one week out, which provides information necessary to identify potential demand planning issues.

To further explain the operation of identifying potential demand planning issues, an example is now given. In the following example, TABLE 2 provides a one week out forecast for a week-x implies the forecast generated for week-x one week before week-x, two week out forecast for week-x implies the forecast generated for week-x two weeks before week-x and so on.

TABLE 2

| Site_ID | Forecast Week | Product name | Jun. 13, 2008 | Jun. 20, 2008 | Jun. 27, 2008 | Jul. 4, 2008 | Jul. 11, 2008 | Jul. 18, 2008 | Jul. 25, 2008 |
| --- | --- | --- | --- | --- | --- | --- | --- | --- | --- |
| India | Jun. 7, 2008 | Part-xxx | 339 | 339 | 339 | 339 | 372 | 372 | 372 |
| India | Jun. 14, 2008 | Part-xxx | | 923 | 923 | 500 | 923 | 823 | 823 |
| India | Jun. 21, 2008 | Part-xxx | | | 925 | 1114 | 909 | 949 | 1031 |
| India | Jun. 28, 2008 | Part-xxx | | | | 901 | 901 | 901 | 901 |
| India | Jul. 5, 2008 | Part-xxx | | | | | 901 | 901 | 901 |
| India | Jul. 12, 2008 | Part-xxx | | | | | | 889 | 888 |
| India | Jul. 19, 2008 | Part-xxx | | | | | | | 1042 |

As shown in TABLE 2 for the week-ending 7/4/2008, 4 week out forecast (forecast week=06/06/2008) is 339 items, 3 week out forecast (forecast week=06/14/2008) is 500 items, 2 week out forecast (forecast week=06/21/2008) is 1114 items and 1 week out forecast (forecast week=06/28/2008) is 901 items. In this example, if a supplier of one or more supply chain entities 120a-120n has a lead time of 4 weeks, that is, it takes 4 weeks to receive the material once the order is given to the supplier due to manufacturing and/or transportation, then for meeting the demand for 7/4/2008, the supplier would have made the shipment based on the 4 week out forecast of 7/4/2008, the forecast week of 6/7/2008 (i.e., 339 items).

Continuing with this example, the data in TABLE 2 shows that a user has varied the forecast for 7/4/2008 in subsequent forecasting cycles and has moved it upwards. However the replenishment for 7/4/2008 is be based on 339 items. So on 7/4/2008; suppose the actual demand is 850 items, there is a stock-out or a backlog.

In one embodiment, the root cause of this issue is shown by the historical forecasts and the actual demands. For example, suppose, as confirmed from data, that replenishments have happened as planned, but the forecast moved upwards later, meaning that 4 week-out forecast accuracy was not good. In such cases, the root cause may be forecasting issues which provide for supply chain planner 110 to analyze why forecast accuracy was inaccurate and how the forecast accuracy can be improved in the future.

At step 306, supply chain planner 110 analyzes trends in summary statistics determined at step 202 of FIG. 2 that quantify the deviation of actual demand against forecasted demand. In particular, supply chain planner 110 determines if trends show the process to be out of control from expected norms, such as for example, using techniques like Western Electric Rules1 and Six Sigma analysis. Although particular techniques are described, embodiments contemplate using any appropriate technique to perform demand error review such as, for example, Weighted Mean Absolute Percent Error trends, Bias trends as measured by a statistical "Tracking Signal" and De-causalled (or smoothened) demand signal, or other like techniques. In addition or as an alternative, the De-causalled demand signal, discussed below in more detail, may compensate for lumpiness. That is, supply chain planner 110 detects when an unexpected order, for example, an unexpected large order occurs. In addition, the tracking signal detects bias trends, that is, bias is, for example, if one or more supply chain entities 120*a*-120*n* always forecasts to high, or if one or more supply chain entities 120*a*-120*n* always forecasts to low.

At step 308, supply chain planner 110 reviews actual replenishment patterns against forecasted demand and actual demand. For example, supply chain planner 110 identifies anomalies to isolate cases where supply may be out of synch with requested forecasts and/or actual demands. In addition, or as an alternative, supply chain planner 110 determines what is planned to arrive at each stock keeping location of supply chain entities 120*a*-120*n*, what is planned to be consumed, what is the status of any stock out in the future. In addition, supply chain planner continues to monitor the past to determine what came in and what went out, and synchronize.

At step 310, supply chain planner 110 reviews current planned shipments against most up-to-date need. That is, supply chain planner 110 analyzes the forward looking, i.e., what is scheduled to come in and how is it scheduled to be consumed and whether there are any potential, for example, code 1 or code 2 stock outs in the future, or is there too much coming in and shipments should be stopped. In addition, or as an alternative, supply chain planner 110 evaluates proactive adjustments to supply chain plans in collaboration with supply chain partners such as, one or more other supply chain entities 120*a*-120*n*. In addition, supply chain planner 110 identifies imminent stock-outs or excess inventory build-ups if existing plans are not altered. In another embodiment, supply chain planner 110 performs automated analysis to suggest changes to the supply chain plan that will mitigate these problems.

In one embodiment, a user associated with system 100 is provided an early warning on what will happen in-between planning cycles. For example, given what the supply chain planning engine is planning to do, after the planning engine has optimized the supply chain plan, there are still imminent stock outs that the user can still do something about, based on the early warnings in-between planning cycles. In addition, embodiments provide for the ability of the user to take additional liberties that may not have been accounted for in the models.

At step 312, supply chain planner 110 reviews the replenishment patterns from step 308. In this step, supply chain planner 110 reviews inventory policy parameters 116*d* such as minimum safety stock targets, replenishment intervals, sourcing splits and reorder quantities to determine any significant changes from previously published parameters.

In one embodiment, supply chain planner 110 focuses on understanding what changed and why. Inventory policy parameters 116*d* will only change if, for example, input data changes. As an example only, and not by way of limitations, supply chain planner 110 communicates that the demand has changed to a user of system 100 and exposes an inside about the supply chain network. In addition, supply chain planner 110 isolates root causes by pin-pointing specific input data changes that result in inventory policy parameters 116*d* changes.

At step 314, supply chain planner 110 identifies alert rules pinpointing "likely suspects" via automated rules based inferences (i.e. business rules 116*c*). In addition, supply chain planner 110 confirms root cause via collaboration and consensus between supply chain functions such as demand planning, supply planning, buyers, suppliers and the like.

To further explain the identification of root causes, examples are now given. In the following examples, supply chain planner 110 accesses database 116 to determine root causes. For example, if supply chain planner 110 determines that the historical forecast demand is consistently higher than actual demand, which may, for example, lead to excess inventory, and replenishments are in synch with foreasts, then the the root cause is to correct the forecast, such that it is in synch with actual demand.

In addition, if a supplier of one or more supply chain entities 120*a*-120*n* has a replenishment pattern, wherein the replenishment pattern is, for example, every alternate week, but, the supplier made replenishments irrespective of the existing inventory, because of, for example, a replenishment policy. Then, the supplier is not replenishing to maintain the actual inventory equal to optimal inventory which leads to a high inventory. Furthermore, if supply chain planner 110 determines that the historical forecast given for replenishment is in synch with actual demands, but that the replenishments are not in synch with the forecast demands, than backlogs or excess inventory can occur.

If supply chain planner 110 determines that the historical forecast is in synch with actual demands for maximum weeks, when the actual demands has increased. As a result, the inventory falls drastically, since the replenishments were based on historical forecasts and hence the inventory levels continued to be low. If supply chain planner 110 determines that the replenishments are not regular and as a result, the inventory keeps swinging from being excess to shortages. If supply chain planner 110 determines that the item was consumed for the last time after there are no longer any shipments or consumptions. Than the inventory is aging inventory, after the item has reached its end of life and the aging inventory needs to be cleared up.

As discussed above, supply chain planner 110 determines root causes which are then analyzed in a para to analysis, to stack up the root causes to determine which root causes have the most impact on various business rules 116*c*, such as for example, costs, business, and the like. In one embodiment, supply chain planner 110 addresses the identified root causes and the affects on the outcome of policies parameters 116*d* or the supply chain network to minimize future like occurrences.

At step 316, supply chain planner 110 prioritizes the root causes in order of business impact, importance, urgency and effort needed for short and long-term resolution according to business rules 116*c*. At step 318, supply chain planner 110 provides proactive and reactive actions (both short term and/or long-term) to not only avoid imminent stock-outs or excesses but also to mitigate or eliminate root causes from occurring in the future. For example, some of the typical actions that supply chain planner 110 provides is adjustments to demand forecasts, adjustments to Material Requirements Plans (MRP) published to suppliers, changes to shipment plans, adjustments to published inventory policy parameters (such as safety stock targets), actions to re-assign or dispose aging inventory, and corrections to data in source systems.

In one embodiment, supply chain planner 110 feeds step 318 actions into the next planning cycle (i.e., step 202), which results in a system and process that are self-tuning with each decision-action loop turning into a cycle of learning. For example, as one or more supply chain entities 120a-120n utilize the framework of the present invention, these one or more supply chain entities 120a-120n are able to transform to a learning organization that is constantly improving and tuning the inventory policy parameters in response to changing market conditions.

Figure 4:
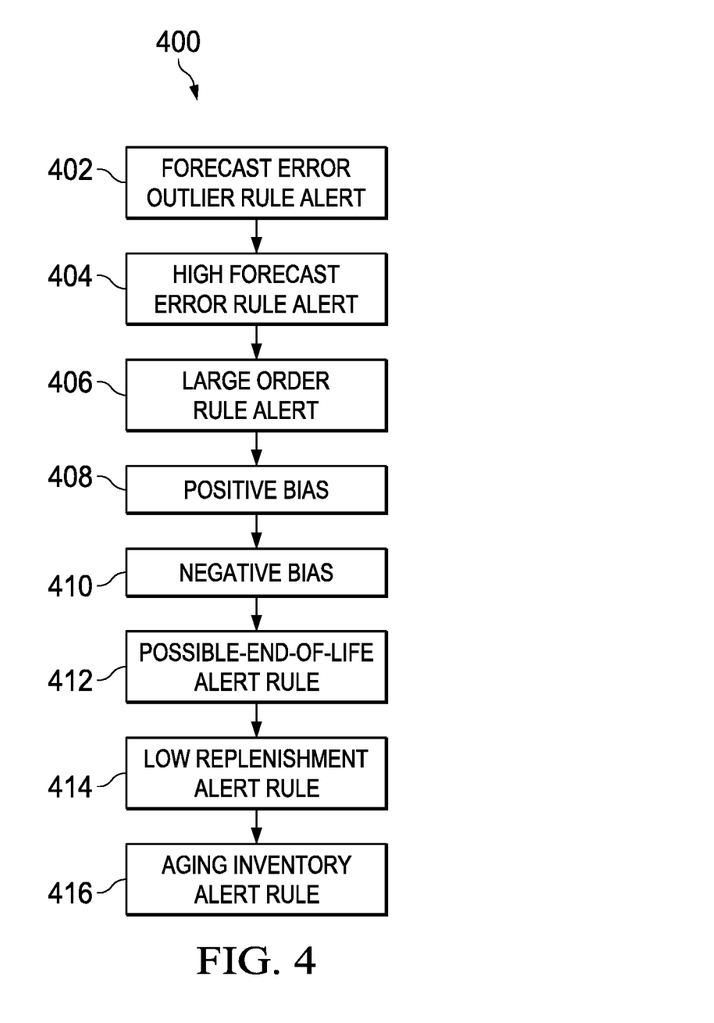
FIG. 4 illustrates an exemplary method of analyzing the deviation of actual demand against forecasted demand and providing alert rules.

FIG. 4 illustrates an exemplary method 400 of analyzing the deviation of actual demand against forecasted demand and providing alert rules. As discussed above, supply chain planner 110 analyzes the deviation of actual demand against forecasted demand and triggers one or more alert rules according to business rules 116c of database 116. Supply chain planner 110 determines at step 402 if the Weighted Mean Absolute Percent Error for an item-location for the most recent time-period exceeds an outlier threshold (that is, it was "capped"), if so, supply chain planner 110 triggers a forecast error outlier rule alert. At step 404, supply chain planner 110 determines if the Weighted Mean Absolute Percent Error for an item-location for the most recent time-period exceeds a "high-error" threshold but does not exceed the outlier threshold, if so, supply chain planner 110 triggers a high forecast error rule alert.

At step 406, supply chain planner 110 determines if the item-location-time-period is coded as an inventory stocked out or dangerously below target and Actual>L*Decausaled Actuals, supply chain planner 110 flags a large order rule alert for this item-location-time-period, wherein L is a configurable parameter with a default value of, for example, 1.3. In addition, supply chain planner 110 computes the Decausaled Actuals quantity using, for example, a centered moving average, as discussed below in more detail.

To further explain the operation of computing Decausaled Actuals an example is now given. In the following example a 5 week moving average is provided below in TABLE 3.

for the Actual Shipments column for the week of 08/08/2008. Accordingly, the 5-week Decauseled moving average for the most recent two weeks ending 07/25/2008 and 08/01/2008 are based on 4 weeks and 3 weeks of data respectively.

At step 408, supply chain planner 110 determines if the tracking signal >P, if so, supply chain planner 110 flags a positive bias alert rule for each week this condition is met, wherein the threshold P is a configurable parameter with a default value of, for example 6. At step 410, supply chain planner 110 determines if the tracking signal <N, if so, supply chain planner 110 flags a negative bias alert rule for each week this condition is met, wherein the threshold N is a configurable parameter with a default value of for example −6.

At step 412, supply chain planner 110 determines if an item has been coded as inventory stocked out or dangerously below target for R or more weeks, consumption has been 0 for Z or more weeks and there was no large orders in the last 4 weeks, if so, supply chain planner 110 triggers a possible end-of-life alert rule. R and Z are configurable parameters with default values of, for example, R=3, Z=3. At step 414, supply chain planner 110 determines if an item has been coded as inventory stocked out or dangerously below target or as inventory too low and at high risk of stock-out for the last 4 weeks, and the item does not meet a Possible-End-of-Life alert rule, a positive bias alert condition, or a large order alert condition, if so, supply chain planner 110 triggers a low replenishment alert rule.

At step 416, supply chain planner 110 determines if the item has been coded as inventory to high or inventory is excessively too high and likely at risk of obsolescent for the past 4 weeks and there is no positive bias and there is no negative bias, if so, supply chain planner 110 triggers an aging inventory alert rule.

In one embodiment, supply chain planner 110 provides a sequence to each of the alert rules. In addition, or as an alternative, if the same item-location-time-period qualifies for more than one alert rule, then supply chain planner 110 determines which one will have priority, such as, the last one is given priority. In addition, supply chain planner 110 provides the following sequence of alert rules: high forecast error, forecast error outlier, large order, positive bias, negative bias, possible end-of-life, low replenishment, and aging inventory. Although, particular alert rules and a particular

TABLE 3

| Row | Site_ID | Item Number | Week Ending | Actual Shipments | Rows considered in centered moving average | "Decausaled Actuals" = 5 Week Centered Moving Average | % deviation of Actual from smoothened cons |
|---|---|---|---|---|---|---|---|
| 1 | Site_A | Item_X | Jun. 6, 2008 | 704 | | | |
| 2 | Site_A | Item_X | Jun. 13, 2008 | 704 | | | |
| 3 | Site_A | Item_X | Jun. 20, 2008 | 704 | 1, 2, 3, 4, 5 | 792 | −11% |
| 4 | Site_A | Item_X | Jun. 27, 2008 | 880 | 2, 3, 4, 5, 6 | 1003 | −12% |
| 5 | Site_A | Item_X | Jul. 4, 2008 | 968 | 3, 4, 5, 6, 7 | 1056 | −8% |
| 6 | Site_A | Item_X | Jul. 11, 2008 | 1760 | 4, 5, 6, 7, 8 | 1390 | 27% |
| 7 | Site_A | Item_X | Jul. 18, 2008 | 968 | 5, 6, 7, 8, 9 | 1619 | −40% |
| 8 | Site_A | Item_X | Jul. 25, 2008 | 2376 | 6, 7, 8, 9 | 1782 | 33% |
| 9 | Site_A | Item_X | Aug. 1, 2008 | 2024 | 7, 8, 9 | 1789 | 13% |
| 10 | Site_A | Item_X | Aug. 8, 2008 | | | | |

In TABLE 3 it is assumed that the "current week" is week ending 08/08/2008 and "today" is between 08/02/2008 and 08/08/2008. Which is why, for example, that there is no data sequence is described, embodiments contemplate any particular alert rule and/or sequence without departing from the scope of the present invention.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of adjusting inventory levels of items at stock keeping locations, comprising:
    a supply chain network comprising two or more supply chain entities, the two or more supply chain entities supply one or more items to satisfy a demand and comprise an inventory of the one or more items at one or more stock keeping locations;
    a computer comprising a processor and a memory, the computer coupled with a database and programmed to:
        access data describing the inventory levels of the inventory of the one or more items at the one or more stock keeping locations of the two or more supply chain entities;
        access data describing one or more replenishment patterns of the one or more stock keeping locations of the two or more supply chain entities;
        quantify a deviation between the one or more replenishment patterns with a forecasted demand and an actual demand of the one or more items at the one or more stock keeping locations of the two or more supply chain entities;
        access and update inventory policy parameters for each of the one or more items at the one or more stock keeping locations of the two or more supply chain entities according to the one or more replenishment patterns;
        generate an executable inventory replenishment plan in accordance with the updated inventory policy parameters; and
    responsive to the executable inventory replenishment plan, at least one of the two or more supply chain entities automatically adjust the inventory levels of the inventory of the one or more items at the one or more stock keeping locations based on the updated inventory policy parameters.

2. The system of claim 1, wherein the one or more stock keeping locations are one or more locations located within at least one of the one or more entities.

3. The system of claim 1, wherein the inventory policy parameters comprise one or more of minimum safety stock targets, replenishment intervals, sourcing splits and reorder quantities.

4. The system of claim 1, wherein the computer is further programmed to generate an inventory replenishment plan in order to meet demand and the two or more supply chain entities maintain inventory levels of the inventory of the one or more items at the one or more stock keeping locations within one or more inventory policy parameters.

5. The system of claim 1, wherein the computer is further programmed to identify one or more root causes and generate one or more alert rules to modify one or more of the updated inventory policy parameters.

6. The system of claim 1, wherein the computer is further programmed to:
    access one or more demand patterns comprising data representing historical forecasted demand and actual demand for the one or more items at the one or more stock keeping locations;
    and access one or more replenishment patterns comprising data representing the size and frequency of replenishments for the one or more items at the one or more stock keeping locations.

7. A computer-implemented method of adjusting inventory levels of items at stock keeping locations, comprising:
    accessing data describing inventory levels of inventory of one or more items at one or more stock keeping locations of a supply chain network, the supply chain network comprises two or more supply chain entities that supply one or more items to satisfy a demand;
    accessing data describing one or more replenishment patterns of the one or more stock keeping locations of the two or more supply chain entities;
    quantifying a deviation between the one or more replenishment patterns with a forecasted demand and an actual demand of the one or more items at the one or more stock keeping locations of the two or more supply chain entities;
    accessing and updating inventory policy parameters for each of the one or more items at the one or more stock keeping locations of the two or more supply chain entities according to the one or more replenishment patterns;
    generating an executable inventory replenishment plan in accordance with the updated inventory policy parameters; and
    responsive to the executable inventory replenishment plan, at least one of the two or more supply chain entities automatically adjusting the inventory levels of the inventory of the one or more items at the one or more stock keeping locations based on the updated inventory policy parameters.

8. The computer-implemented method of claim 7, wherein the one or more stock keeping locations are one or more locations located within at least one of the one or more entities.

9. The computer-implemented method of claim 7, wherein the inventory policy parameters comprise one or more of minimum safety stock targets, replenishment intervals, sourcing splits and reorder quantities.

10. The computer-implemented method of claim 7, further comprising generating an inventory replenishment plan in order to meet demand and the two or more supply chain entities maintain inventory levels of the inventory of the one or more items at the one or more stock keeping locations within one or more inventory policy parameters.

11. The computer-implemented method of claim 7, further comprising identifying one or more root causes and generating one or more alert rules to modify one or more of the updated inventory policy parameters.

12. The computer-implemented method of claim 7, further comprising:
    accessing one or more demand patterns comprising data representing historical forecasted demand and actual demand for the one or more items at the one or more stock keeping locations; and
    accessing one or more replenishment patterns comprising data representing the size and frequency of replenishments for the one or more items at the one or more stock keeping locations.

13. A non-transitory computer-readable medium embodied with software for adjusting inventory levels of items at stock keeping locations, the software when executed using one or more computers is programmed to:
- access data describing inventory levels of inventory of one or more items at one or more stock keeping locations of a supply chain network, the supply chain network comprises two or more supply chain entities that supply one or more items to satisfy a demand;
- access data describing one or more replenishment patterns of the one or more stock keeping locations of the two or more supply chain entities;
- quantify a deviation between the one or more replenishment patterns with a forecasted demand and an actual demand of the one or more items at the one or more stock keeping locations of the two or more supply chain entities;
- access and update inventory policy parameters for each of the one or more items at the one or more stock keeping locations of the two or more supply chain entities according to the one or more replenishment patterns;
- generate an executable inventory replenishment plan in accordance with the updated inventory policy parameters; and
- responsive to the executable inventory replenishment plan, at least one of the two or more supply chain entities automatically adjust the inventory levels of the inventory of the one or more items at the one or more stock keeping locations based on the updated inventory policy parameters.

14. The non-transitory computer-readable medium of claim 13, wherein the one or more stock keeping locations are one or more locations located within at least one of the one or more entities.

15. The computer-implemented method of claim 13, wherein the inventory policy parameters comprise one or more of minimum safety stock targets, replenishment intervals, sourcing splits and reorder quantities.

16. The computer-implemented method of claim 13, wherein the software is further programmed to generate an inventory replenishment plan in order to meet demand and the two or more supply chain entities maintain inventory levels of the inventory of the one or more items at the one or more stock keeping locations within one or more inventory policy parameters.

17. The computer-implemented method of claim 13, wherein the software is further programmed to identify one or more root causes and generate one or more alert rules to modify one or more of the updated inventory policy parameters.

18. The computer-implemented method of claim 13, wherein the software is further programmed to:
- access one or more demand patterns comprising data representing historical forecasted demand and actual demand for the one or more items at the one or more stock keeping locations; and
- access one or more replenishment patterns comprising data representing the size and frequency of replenishments for the one or more items at the one or more stock keeping locations.

* * * * *